UNITED STATES PATENT OFFICE.

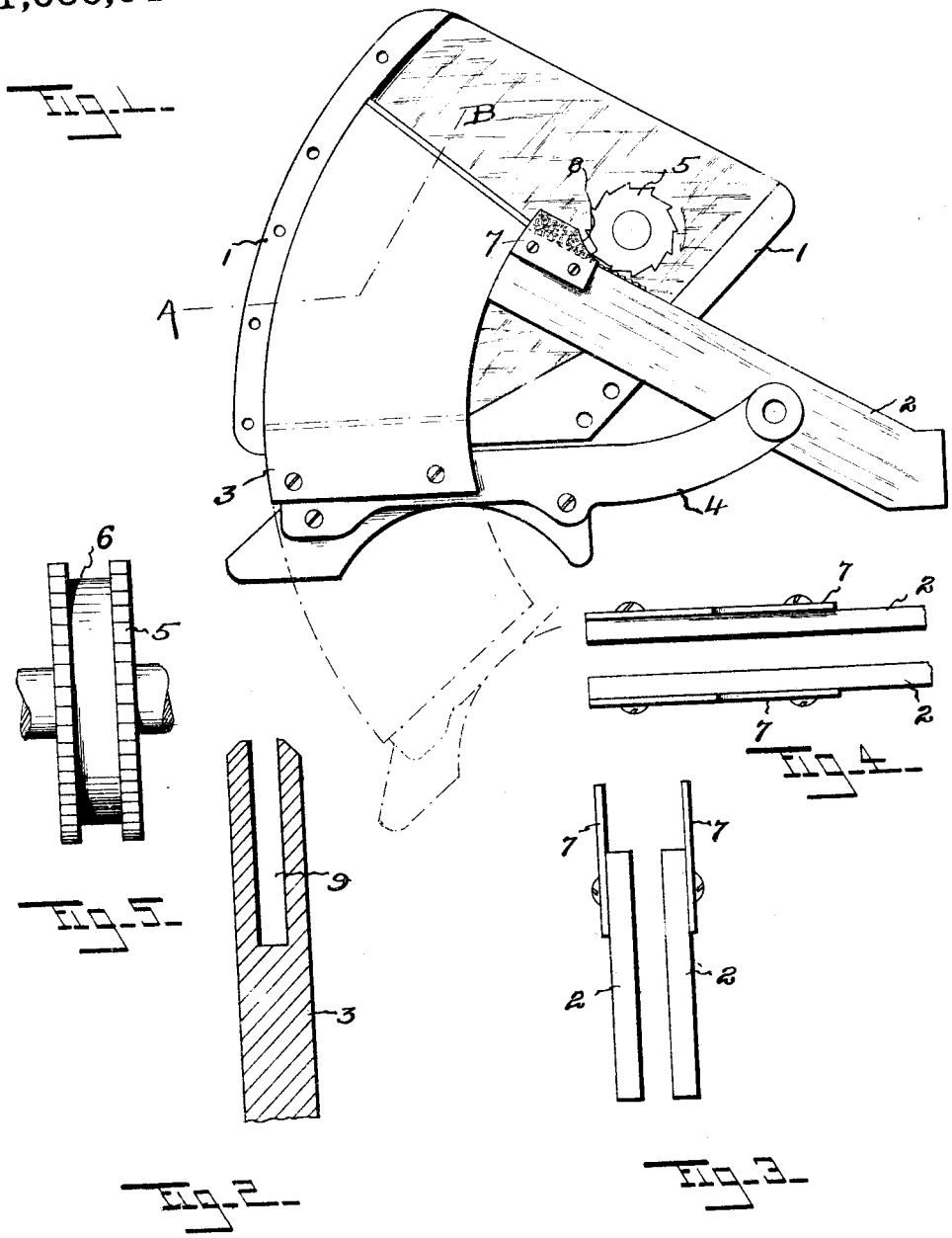

RICHARD LESTER WILCOX, OF WATERBURY, CONNECTICUT, ASSIGNOR TO THE WATERBURY FARREL FOUNDRY AND MACHINE COMPANY, OF WATERBURY, CONNECTICUT, A CORPORATION OF CONNECTICUT.

ATTACHMENT FOR FEEDING DEVICES.

1,036,048.  Specification of Letters Patent.  Patented Aug. 20, 1912.

Application filed November 21, 1911. Serial No. 661,624.

*To all whom it may concern:*

Be it known that I, RICHARD LESTER WILCOX, a citizen of the United States, residing at Waterbury, in the county of New Haven and State of Connecticut, have invented certain new and useful Improvements in Attachments for Feeding Devices, of which the following is a specification, reference being had therein to the accompanying drawings.

My invention relates to new and useful improvements in attachments for feeding devices, having for its object, among other things, to provide a container or reservoir for blanks in connection with a hopper chute, whereby an auxiliary supply of blanks may be assembled for ready entrance into the chute.

To these, and other ends, my invention consists in the attachment for feeding devices, having certain details of construction, and combinations of parts, as will be hereinafter described, and more particularly pointed out in the claims.

Referring to the drawings, in which like numerals of reference designate like parts in the several figures; Figure 1 is a view of the interior of a hopper, the nigh side thereof being removed, with the delivery chute connected therewith and the pick-up blade in its up position. Fig. 2 is an enlarged sectional view of the pick-up blade on line A—B of Fig. 1; Fig. 3 is an end view of the delivery chute; Fig. 4 is a plan view of the upper end thereof; and Fig. 5 is an elevation of the clearance wheel.

In the type of mechanism to which my invention is particularly applied, the blanks are thrown indiscriminately into a hopper, having a delivery chute connected therewith, and through which a pick-up blade, having a slot in its upper edge, is movable vertically, which registers in its up position with the inner end of the delivery chute. In operation, the pick-up blade, during its upward movement, passes through the mass of blanks, and some of them drop into the slot in the upper surface thereof and are carried upwardly with the blade and slide by gravity therefrom into the delivery chute when the blade is in its up position, a clearance wheel being provided adjacent to the inner end of said chute to knock off such blanks as are not properly entered.

The device just described is common in the art and in very general use, but in certain classes of work, especially where the blanks are very short or require rapid feeding from the delivery chute, the blanks are not always admitted into the delivery chute with sufficient rapidity to furnish a continuous stream of blanks to the operating parts. Two causes contribute to bring about this result. First,—the number of blanks taken from the hopper by the pick-up blade in its upward movement varies greatly, sometimes picking up few or none, and at other times its full capacity, hence the stream of blanks delivered into the chute is broken and not regular. This irregularity is not of serious importance when the blanks are to be fed slowly, but when it is desired that they be delivered in very rapid succession, the irregularity is a grave and serious objection to this type of hopper mechanism; and second,—no blanks enter the delivery chute except when the pick-up blade is in its up position, and therefore, the time consumed by the said blade in traveling to its down position and back again is entirely lost for the admission of blanks to the said delivery chute. In my invention I have overcome the difficulty described by providing a container or reservoir for storing blanks at the upper end of the chute adjacent to the clearance wheel, so that when the pick-up blade lifts a full supply of blanks from the hopper, more in fact than can slide down through the delivery chute, the excess is stored in this reservoir and drops into the said delivery chute while the blade is going down and returning with a new supply of blanks. By this mechanism the supply of blanks at the delivery end of said chute is substantially uniform, the delivery of the full capacity of blanks from the pick-up blade equalizing those movements of the blade wherein none, or comparatively few, are lifted from the hopper.

In the drawings, the section of the hopper illustrated, is designated by the numeral 1, the delivery chute being rigidly secured thereto in a well known manner and constructed, as is usual with two parallel plates 2, with an open space therebetween of substantially the same width as the diameter of the blank. The pick-up blade 3 has a slot 9 in its upper surface of substantially the same width as the open space between the plates 2 and is secured to an arm 4, that is pivotally mounted in a fixed part. A clearance wheel 5 is rotatably mounted in the hopper, with an annular groove 6 in the face thereof of substantially the same width and depth as the head of the blank, so that as the blank enters the delivery chute in proper position with the shank between the plates 2—2 and the underside of the head resting upon the top thereof, the head will pass through said groove, but if the blank is in any other position than the one described, the clearance wheel will knock it off the chute into the hopper.

My invention consists in attaching to the chute at its upper end the plates 7—7, substantially as shown in the drawings, wherein they project above the top of the plates 2—2, and are curved at their inner end at 8, so as not to interfere with the movement of the clearance wheel 5: I prefer, for convenience in manufacture, to make these plates 7 separate and attach them to the plate 2, but they may be made integral with the said plate 2 if desired and within my invention. This arrangement of the plates 7 and 2 forms a container or reservoir, in which a supply of blanks is stored between the plates 7 upon the upper side of the plate 2 adjacent to the clearance wheel, and the excess blanks, as lifted by the pick-up blade, instead of falling off and dropping into the hopper as heretofore, are delivered therefrom into this container or reservoir and are tossed about therein by the clearance wheel and the shifting of the blanks until they find their correct position in the delivery chute and slide down between the plates 2. While the pick-up blade is going to the bottom of the hopper for a new supply of blanks, the blanks remaining in the reservoir are constantly finding their correct position and enter the delivery chute. In this device the feeding of blanks is regular and constant.

What I claim as new, and desire to secure by Letters Patent, is:—

1. In a device of the character described, the combination with a hopper; of a delivery chute connected therewith, a pick-up mechanism operative within said hopper and registering in one of its positions with the said delivery chute; a clearance device operatively mounted adjacent to the hopper end of said chute; and means for temporarily storing an excess supply of blanks on said delivery chute between said clearance device and the hopper end of said chute, said means comprising side plates connected with said chute and projecting above the top thereof and above the bottom edge of said clearance device, so that the movement of said clearance device will agitate the blanks between said plates without knocking them off the chute into the hopper.

2. In a device of the character described, the combination with a hopper; of a delivery chute; a clearance device operatively mounted adjacent to the hopper end of said chute; a pick-up mechanism operative within said hopper and registering in one of its positions with the hopper end of said chute; and means for maintaining a uniform and constant flow of blanks at the discharge end of said chute, comprising a storage reservoir above the top of said chute at the hopper end thereof and lying between said hopper end and said clearance device, said reservoir being of sufficient size to permit blanks to lie therein at any angle or position in relation to the opening between the plates comprising the said discharge chute.

In testimony whereof I affix my signature in presence of two witnesses.

RICHARD LESTER WILCOX.

Witnesses:
   GEORGE WILDER,
   CLIFFORD PETITJEAN.